No. 755,916. Patented March 29, 1904.

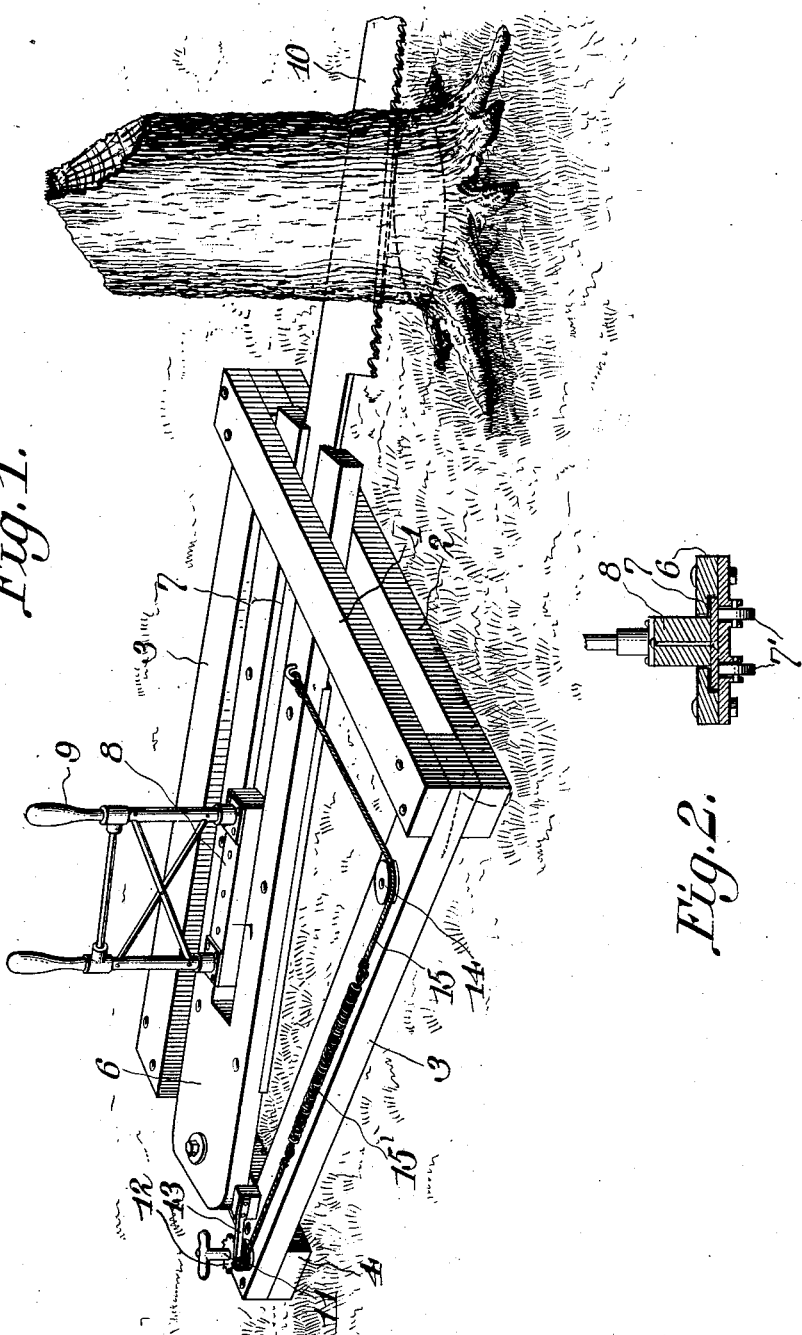

UNITED STATES PATENT OFFICE.

THEODORE C. McCORMICK, OF PATTERSON, MISSOURI.

SAWING-MACHINE.

SPECIFICATION forming part of Letters Patent No. 755,916, dated March 29, 1904.

Application filed December 11, 1903. Serial No. 184,807. (No model.)

*To all whom it may concern:*

Be it known that I, THEODORE C. McCOR-MICK, a citizen of the United States, residing at Patterson, in the county of Wayne and State of Missouri, have invented a new and useful Sawing-Machine, of which the following is a specification.

This invention relates to sawing-machines, and one of the primary objects thereof is to facilitate the sawing of trees and stumps close to the ground.

A further object of the invention is to provide a sawing-machine having a saw the teeth of which will remain in constant contact with the stuff to be sawed.

A further object is to provide an improved mechanism for maintaining the saw-teeth in constant contact with the stuff to be cut.

Further objects and advantages of this invention will appear in the following description, and the novel features thereof will be particularly pointed out in the appended claims, it being understood that changes in the form, proportion, and the minor details of construction may be resorted to without departing from the spirit or sacrificing any of the advantages of this invention.

In the drawings, Figure 1 is a perspective view of the machine complete, and Fig. 2 is a cross-sectional view through the saw-guide and the saw-stock.

In the drawings illustrating the preferred embodiment of my invention a base-frame is shown as comprising two spaced end battens 1 and 2, between which are secured the ends of the side rails 3 3, terminally connected by an end batten 4.

Intermediate the ends of the end batten 4 is pivoted a laterally-swinging saw-guide 6, with its free ends projecting between the spaced battens 1 and 2, whereby the saw-guide is in turn guided during its swing movement. The saw-guide is provided with a longitudinal slot 7, in which are antifriction-rollers 7' for the reciprocating saw-carrying stock 8, capable of being operated by the handle 9. By moving the stock 8 back and forth the saw 10 will be caused to perform the necessary cut into the wood.

A tension or feed mechanism is provided for the saw which is illustrated as comprising a ratchet mechanism with a flexible connection between it and the saw-guide. The specific construction of the ratchet mechanism is shown as a hand-operated rotatable winding-shaft 11 on the frame and carrying a ratchet 12 for engagement with a pawl 13 on the frame. 14 is a pulley on the frame and around which a cord 15 passes and is connected to the pivoted saw-guide. The other end of the cord is attached to a coil-spring 15', capable of being wound upon the shaft 11, so as to increase the tension or feed of the saw-guide as it is wound upon the shaft. This mechanism will maintain a constant contact between the saw-teeth and the material to be cut, and thus the automatic feed will greatly facilitate the process of sawing.

This machine being adapted to saw off trees and stumps close to the ground facilitates the clearing of land and placing it in condition for a mower or like machine to pass thereover without coming in contact with the stumps and avoids the necessity of grubbing up the stumps prior to planting.

What I claim, and desire to secure by Letters Patent, is—

1. In a sawing-machine, the combination with a frame having two spaced end battens, of a saw-guide pivoted to the frame and projecting between the end battens of the frame, a reciprocating saw-carrying stock movable in the guide and having a handle for operating it, a ratchet mechanism carried by the frame and an elastic connection interposed between the ratchet mechanism and the saw-guide.

2. In a sawing-machine, a base-frame having a pair of spaced end battens, a pivoted, transversely-swinging saw-guide carried by the frame and guided between the end battens, a reciprocating saw-stock movable in the saw-guide, a rotatable, winding-shaft on the frame, a ratchet carried by the shaft, a pawl for the ratchet, a spring connected to the shaft, and a cord connected to the spring and to the saw-guide.

In testimony that I claim the foregoing as my own I have hereto affixed my signature in the presence of two witnesses.

THEODORE C. McCORMICK.

Witnesses:
J. E. REED,
LEE SHIPMAN.